(12) United States Patent
Walker et al.

(10) Patent No.: US 7,938,707 B1
(45) Date of Patent: May 10, 2011

(54) METHODS FOR BATCH FABRICATION OF COLD CATHODE VACUUM SWITCH TUBES

(75) Inventors: Charles A. Walker, Albuquerque, NM (US); Frank R. Trowbridge, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 403 days.

(21) Appl. No.: 12/168,625

(22) Filed: Jul. 7, 2008

(51) Int. Cl.
*H01J 1/00* (2006.01)
*H01J 1/30* (2006.01)
*H01J 9/00* (2006.01)

(52) U.S. Cl. ............... 445/23; 445/46; 445/50; 445/58; 313/356; 313/355

(58) Field of Classification Search .............. 445/23, 445/24, 46, 50, 58; 313/356, 631
See application file for complete search history.

(56) References Cited

U.S. PATENT DOCUMENTS

| | | | |
|---|---|---|---|
| 4,673,842 A * | 6/1987 | Grieger et al. ............ 313/292 |
| 5,075,594 A * | 12/1991 | Schumacher et al. ... 315/111.21 |
| 5,550,430 A | 8/1996 | Navaroli et al. |
| 5,725,408 A | 3/1998 | Boettcher |
| 5,739,637 A | 4/1998 | Boettcher |
| 6,657,370 B1 * | 12/2003 | Geusic .................. 313/356 |
| 7,297,041 B2 * | 11/2007 | Eden et al. ................. 445/46 |
| 2002/0036461 A1 * | 3/2002 | Schoenbach et al. ...... 313/495 |
| 2005/0148270 A1 * | 7/2005 | Eden et al. ................. 445/24 |
| 2007/0017636 A1 * | 1/2007 | Goto et al. ............ 156/345.47 |

OTHER PUBLICATIONS

Bunch, K.J. et al., "Investigation Into Carbon-Trigger Vacuum Switches for High-Voltage, High-Current Switch Applications", 7th IEEE International Vacuum Electronics Conference (IVEC), Monterey, CA, US, Apr. 25-27, 2006.
Walker, C.A. et al., "Comparison of Metal-Ceramic Brazing Methods", 36th International Brazing and Soldering Symposium, Chicago, IL, US, Nov. 13-14, 2007.
Burkes, T.R. et al., "A Review of High-Power Switch Technology", IEEE Transactions on Electron Devices, vol. Ed-26, No. 10, Oct. 1979.
Chu, K.W. et al., "A Comparison of High-Voltage Switches", SAND99-0154, Feb. 1999. (Sandia Corporation Internal Report, publicly available through OSTI).
U.S. Appl. No. 11/231,915, filed Sep. 21, 2005, Roesler et al.
Dunaevsky, Lifetime of ferroelectric cathodes, Journal of Applied Physics, vol. 89, No. 8, Apr. 15, 2001, 4480-4485.

(Continued)

*Primary Examiner* — Sikha Roy
(74) *Attorney, Agent, or Firm* — Olivia J. Tsai (57) ABSTRACT

Methods are disclosed for batch fabrication of vacuum switch tubes that reduce manufacturing costs and improve tube to tube uniformity. The disclosed methods comprise creating a stacked assembly of layers containing a plurality of adjacently spaced switch tube sub-assemblies aligned and registered through common layers. The layers include trigger electrode layer, cathode layer including a metallic support/contact with graphite cathode inserts, trigger probe sub-assembly layer, ceramic (e.g. tube body) insulator layer, and metallic anode sub-assembly layer. Braze alloy layers are incorporated into the stacked assembly of layers, and can include active metal braze alloys or direct braze alloys, to eliminate costs associated with traditional metallization of the ceramic insulator layers. The entire stacked assembly is then heated to braze/join/bond the stack-up into a cohesive body, after which individual switch tubes are singulated by methods such as sawing. The inventive methods provide for simultaneously fabricating a plurality of devices as opposed to traditional methods that rely on skilled craftsman to essentially hand build individual devices.

16 Claims, 5 Drawing Sheets

OTHER PUBLICATIONS

Davidson, Diamond field emission devices, Diamond and Related Materials 12, (2003), 429-433.

Chung, Theoretical Study of Triple Junction Electron Emission for a New Type of Cold Cathode, Department of Physics, Pennsylvania State Univeraity, University Park, PA16802,US, Apr. 25-27, 2006.

Schachter, Analytic expression for triple-point electron emission from an ideal edge, Appl. Phys. Lett. 72, (4), Jan. 26, 1998, 421-423.

Advani, Kiloampere and Microsecond Electron Beams from Ferroelectric Cathodes, IEEE Transactions on Plasma Science, vol. 26, No. 4, Aug. 1998, 1348-1352.

Peterson, Macro-Meso-Microsystems Integration in LTCC: LDRD Report, Sandia Report, SAND2007-1871, Sandia National Laboratories, Mar. 2007.

Rosenman, Electron emission from ferroelectrics, Journal of Applied Physics, vol. 88, No. 11, Dec. 1, 2000, 6109-6161.

Riege, Electron emission from ferroelectrics—a review, Nuclear Instruments and Methods in Physics Research A 340 (1994) 80-89, North Holland.

Krasik, Application of a ferroelectric plasma cathode as a high-current switch, The European Physical Journal D, 19, 89-95 (2002).

* cited by examiner

METHODS FOR BATCH FABRICATION OF COLD CATHODE VACUUM SWITCH TUBES

STATEMENT REGARDING FEDERALLY SPONSORED RESEARCH OR DEVELOPMENT

The United States Government has certain rights in this invention pursuant to Department of Energy Contract No. DE-AC04-94AL85000 with Sandia Corporation.

FIELD OF THE INVENTION

The invention generally relates to cold cathode vacuum switch tubes that by action of a trigger signal are capable of rapidly and repeatedly, switching large currents at high voltages, in extreme environments of shock, radiation and temperature. The invention further relates to methods for batch fabrication (e.g. a plurality fabricated simultaneously) of vacuum switch tubes providing lower cost and enhanced product uniformity over methods based on hand assembly of individual piece parts (e.g. individuals fabricated serially).

BRIEF DESCRIPTION OF THE DRAWINGS

The accompanying drawings, which are incorporated in and form part of the specification, illustrate several embodiments of the present invention and, together with the description, serve to explain the principles of the invention. The drawings provided herein are not drawn to scale.

BACKGROUND

Vacuum switch tubes are needed in applications requiring stand-off of high voltages (e.g. on the order of 500V to 6 kV DC) and fast switching of large currents (e.g. on the order of 300 A to 20 kA). Such applications can include triggering of air-bags, the initiation of explosives, control of high energy physics equipment, power supplies and capacitive discharge units (CDUs). Vacuum switch tubes are typically configured to provide an open circuit, non-conducting condition between a current source and a load. The tube is activated (e.g. switch closed) by a triggering signal to affect an electric discharge within the tube, switching the tube to a closed circuit conducting condition, thereby allowing the passage of current from the source to the load. Further discussion of the operation of vacuum switch tubes can be found for example, in U.S. Pat. No. 5,739,637 to Boettcher, and in "Investigation into Carbon-Trigger Vacuum Switches for High-Voltage, High-Current Switch Applications", by K. J. Bunch, et al., presented at the 7$^{th}$ IEEE International Vacuum Electronics Conference (IVEC) Apr. 25-27, 2006, Monterey, Calif., the entirety of each of which is herein incorporated by reference The assembly of vacuum switch tubes typically requires piece-part hand assembly by highly skilled craft workers which makes them too expensive for many applications. Additionally, piece-part hand assembly of individual units (e.g. individuals fabricated serially) results in variations in assembly which can affect the part to part uniformity of the device's operational characteristics. What are needed are methods for batch fabrication (e.g. a plurality fabricated simultaneously) of vacuum switch tubes to The present invention addresses this need for batch fabrication of vacuum switch tubes by providing methods that comprise stacking an assembly of layers comprising a plurality of tube sub-assemblies, aligned through one or more common layers, and heating the assembly of layers in a vacuum oven to affect joining (e.g. bonding) of the individual layers into a cohesive structure. Joining can be accomplished by methods such as; traditional metallization of ceramics followed by brazing, active metal brazing without the use of ceramic metallizations, or direct brazing methods, again not requiring the use of ceramic metallizations. The latter two approaches yield an additional reduction in the cost of units produced, by eliminating the processing steps and costs associated with producing metallized layers on bare ceramics. Additional descriptions of the traditional metallization and brazing, active metal brazing and direct brazing methods can be found for example in: "Comparison of Metal-Ceramic Brazing Methods", by C. A. Walker et al., presented at the 36$^{th}$ International Brazing and Soldering Symposium, Chicago, Ill., Nov. 13-14, 2007, the entirety of which is incorporated herein by reference.

The bonded structure can then be singulated (e.g. by dicing, laser scribing, sawing etc.) to separate out the individual vacuum switch tubes. The vacuum joining process can produce an evacuated environment (e.g. on the order of $1\times10(-7)$ mmHg) in the vicinity of the anode, cathode and trigger electrodes of the vacuum switch. The methods according to the present invention, by employing a stacked assembly of layers, provides for fabricating a plurality of switch tubes simultaneously in a batch fabrication approach, greatly eliminating hand assembly and piece part counts, thereby reducing the cost of producing a vacuum switch tube. Methods according to the present invention additionally reduce the spread in operational characteristics on a part to part basis, compared to methods based on traditional hand assembly of individual units. Methods according to the present invention can further reduce the cost of switch tubes by employing joining (e.g. brazing) processes that do not require the metallization of ceramic components.

DETAILED DESCRIPTION OF THE INVENTION

Figure 1:
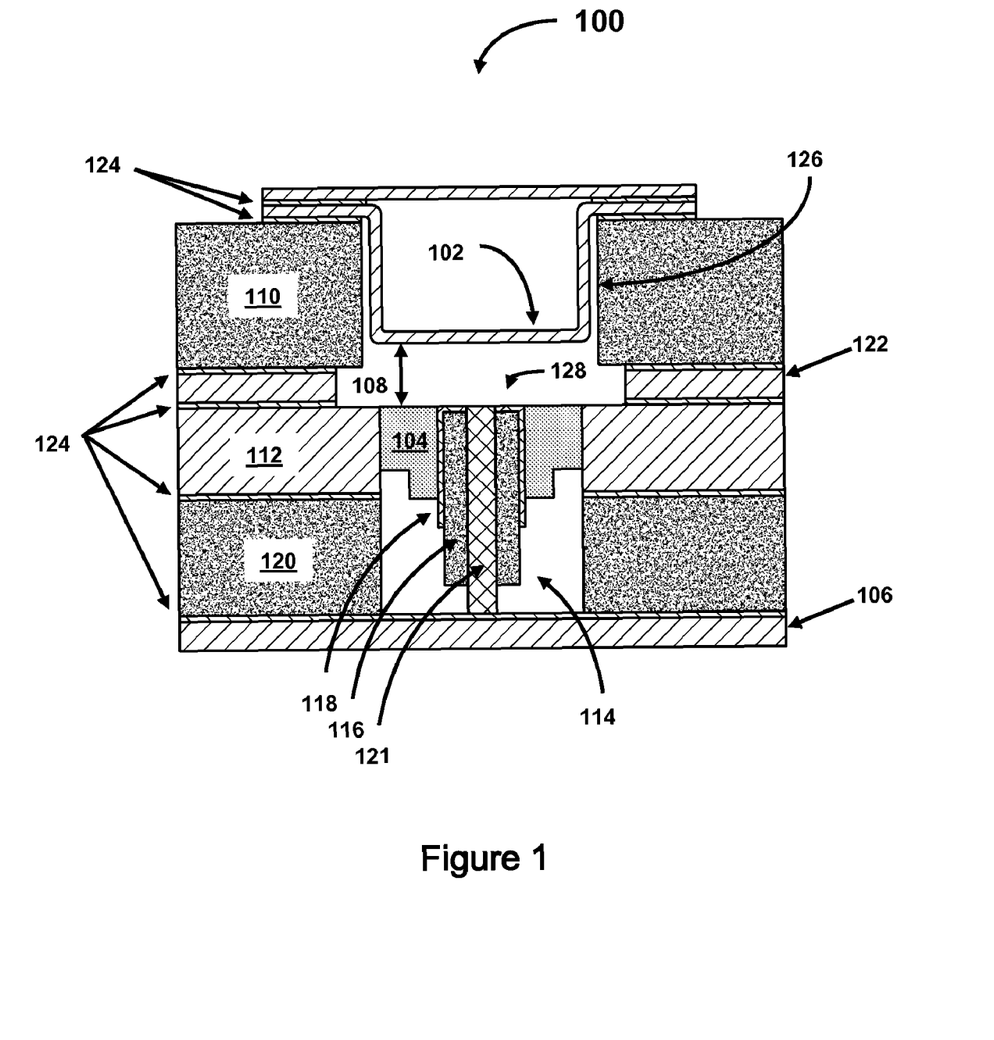
FIG. 1 is a schematic cross-sectional illustration of a non-limiting embodiment of a vacuum switch tube as can be fabricated by embodiments of methods according to the present invention.

FIG. 1 is a schematic cross-sectional illustration of a non-limiting embodiment of a vacuum switch tube, as can be fabricated by embodiments of methods according to the present invention. Vacuum switch tube 100 comprises anode 102 and cathode comprising graphite block 104 separated by a gap 108 (e.g. on the order of 0.010" to 0.100") in a vacuum environment (e.g. less than atmospheric pressure) created within ceramic insulator 110 (i.e. in conjunction with other tube components as described below). Vacuum switch tube 100 can comprise a generally cylindrical (i.e. tubular) configuration symmetrical about the longitudinal axis or can as well comprise a rectangular shape or other external shape as a particular application may require with no effect on the practice of the methods of the invention. The cathode can comprise graphite block 104 inserted (e.g. press-fit as illustrated) within a metal (e.g. niobium, Nb) support 112 that can provide electrical connectivity to the graphite block 104. Trigger electrode 106 (e.g. niobium) is connected to trigger probe 114 that can comprise a ceramic insulator 116 partially coated with a carbon source film 118 and press-fit into carbon block 104. Trigger probe 114 comprises a conductor 121 extending through the body of the ceramic insulator 116. Carbon film 118 can comprise a carbonaceous film deposited by methods such as chemical vapor deposition (CVD) or other method (e.g. sputtering, diamond like carbon (DLC) hand painting) onto ceramic insulator 116. The carbon film 118 can be deposited onto the end face 128 and sidewalls of ceramic insulator 116 and subsequently scribed and/or partially removed by methods such as mechanical abrasion or laser ablation, to prevent the deposited carbon film 118 from extending down the entire length of the sidewalls of the ceramic insulator 116. Conductor 121 can comprise a niobium wire press-fit through the ceramic insulator 116 and provides electrical connection from the trigger electrode 106, through the carbon film 118 and cathode graphite block 104, to the cathode support 112. Trigger electrode 106 is electrically isolated from the cathode support 112 by ceramic insulator 120. The anode-cathode gap 108 can be controlled for example, by fabricating the cathode structure of two conductive (e.g. niobium) layers 112 and 122 and adjusting the thickness of a layer e.g., 122 to achieve a gap 108 of desired dimension. One or more braze alloy layers 124 can be used to join together and hermetically seal the various layers comprising switch tube 100.

The vacuum switch tube 100 operates by creation of carbon plasma to initiate an arc breakdown between the anode 102 and cathode 104 that can have a voltage differential on the order of 500V to 6 kV DC. In the static state, no current flows between anode 102 and cathode 104 and the tube 100 is said to be in an open circuit non-conducting condition. A trigger signal (e.g. on the order of 10 to 100 volts) is applied to trigger electrode 106 causing current to flow through conductor 121 and across the carbon film 118 on the end face 128 of the ceramic body 116 to the graphite cathode block 104. Resistive heating vaporizes a portion of the carbon film 118 on the end face 128 and creates a heated carbon vapor within the anode-cathode gap 108. The high voltage between the anode 102 and cathode 104 strips electrons from atoms within the carbon vapor and quickly establishes an arc breakdown between the anode 102 and the cathode 104, causing the tube to be in a closed circuit conducting condition. Ablated carbon from the deposited film 118 and carbon cathode 104 can deposit on the walls of the ceramic insulator 110 and lead to a conductive path being formed between the anode 102 and cathode 104 leading to a premature device failure. The configuration illustrated wherein the anode 102 has a "cupped" shape (e.g. as a niobium sheet formed by stamping into the cup shape illustrated) creates a shadowed region 126 on the walls of the ceramic insulator 110 effectively preventing the occurrence of this failure mechanism.

As illustrated in FIG. 1, by employing active metal brazing or direct brazing methods, no metallization layers are required on the ceramic insulators 110 and 120, as would be required for traditional metallize and braze methods. This results in a considerable cost savings for the switch tubes produced. Active metal brazing methods employ braze alloys that include a reactive element (e.g. Ti, Zr) capable of reducing oxides on the surface of a ceramic component during the brazing process, thereby allowing the braze alloy to "wet" the ceramic without the need for metallized layers to effect such wetting. Examples of commercially available active metal braze alloy compositions include: {59% Ag, 27.25% Cu, 12.5% In, 1.25% Ti}, {63% Ag, 35.25% Cu, 1.75% Ti}, {62% Cu, 35% Au, 2% Ti, 1% Ni} and {97% Ag, 1% Cu, 2% Zr}. There are many more commercially available compositions these are merely cited here as non-limiting examples. Direct brazing methods employ traditional braze alloys that are found in combination with certain metal-ceramic couples (e.g. joints) to interact with the metal and ceramic layers to form an adherent metallic oxide layer on the ceramic. Some non-limiting examples of commercially available braze alloys suitable for use in direct brazing of niobium to ceramic (e.g. 94% alumina) include: {62% Cu, 35% Au, 3% Ni}, {82% Au, 8% Pd} and {50% Au, 50% Cu}.

As described above, one of the advantages of embodiments of the present invention is the capability for batch fabrication of vacuum switch tubes of the type illustrated by the non-limiting example in FIG. 1. It will be appreciated that other vacuum switch tube configurations can be produced by the methods of the present invention, and that the configuration in FIG. 1 is merely used to exemplify the methods as described herein.

Figure 2:
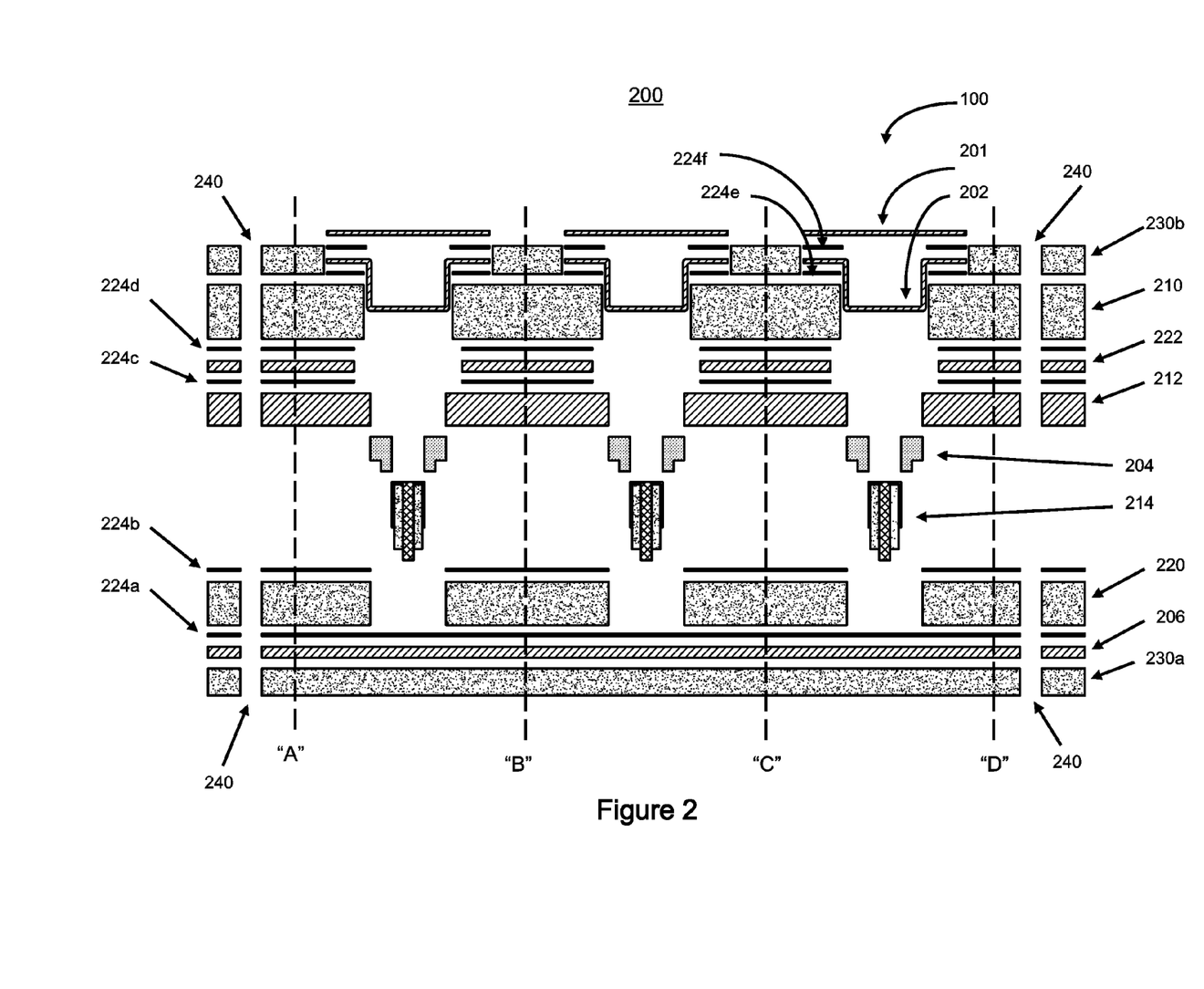
FIG. 2 is a schematic cross-sectional exploded view of an embodiment of a stacked assembly of layers comprising a plurality of spacedly adjacent switch tube sub-assemblies as can be fabricated by methods according to the present invention.
Figure 2A:
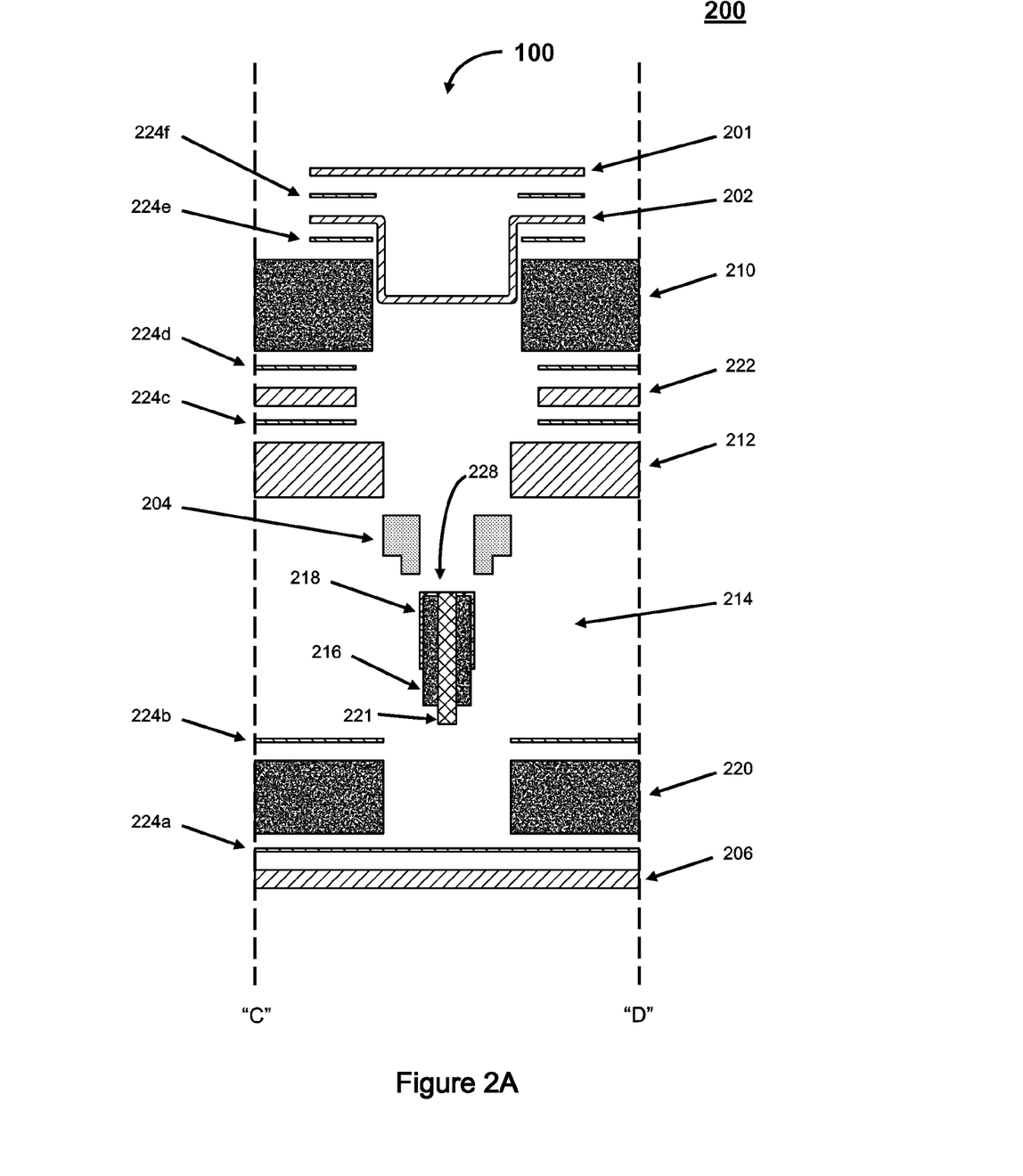
FIG. 2A is a detailed cross-sectional view of the stacked assembly of layers from FIG. 2.

FIG. 2 is a schematic cross-sectional exploded view of an embodiment of a stacked assembly of layers comprising a plurality of spacedly adjacent switch tube sub-assemblies as can be fabricated by methods according to the present invention. FIG. 2A is a detailed cross-sectional view of the stacked assembly of layers from FIG. 2 (without alignment layers as described below). It can be desired to perform one or more cleaning operations on the various components comprising the assembly prior to stacking the various layers. In an exemplary application, vapor degreasing of the components was followed by vacuum firing metallic (e.g. niobium) and graphite piece parts at approximately 1450° C. in a vacuum atmosphere less than 1×10(−6) mmHg for approximately 30 minutes and, air firing the ceramic (e.g. alumina) components at approximately 1000° C. for approximately 60 minutes in air. The assembly of layers can be placed on a supporting substrate 230A (e.g. an alumina plate as an aligning layer) having clearances 240 for insertion of alignment pins (not shown) to aid in the registration and assembly of the stacked assembly. A metallic trigger electrode layer 206 is placed on the supporting substrate 230A over which a braze alloy layer 224a is placed followed by a ceramic insulator layer 220 and then braze alloy layer 224b. Insulator layer 220 (e.g. 94% alumina ceramic) separates and electrically isolates the cathode layer comprising metallic support structure 212 (e.g. niobium) from trigger electrode layer 206. The cathode layer comprises a plurality of spaced clearances (e.g. through-holes) in the support structure 212 through which graphite cathode blocks 204 are inserted. In embodiments of the invention, it has been found structurally sufficient to press fit (e.g. interference fit) the graphite blocks 204 through the clearances of support structure 212. While a brazing or other joining method has not been found necessary for joining the graphite blocks 204 into the support structure 212, one could be used (e.g. a braze alloy) if desired, without effecting the practice of the present invention.

Trigger probe assemblies 214 comprising a ceramic insulator 216 having a carbon coating 218 on an end face 228 and extending down a portion of the sidewall of the ceramic insulator 216 are likewise press fit through clearances through the graphite cathode blocks 204. A metallic conductor (e.g. niobium pin) 221 extends through the ceramic insulator 216 and provides eventual electrical connectivity from the trigger electrode layer 206 through the carbon film 218 and to the graphite block 204 of the cathode structure. It has been found that the pin 221 can be press fit through the ceramic insulator 216 and a slight deformation of the head of the pin 221 (e.g. by swedging or cold forming) at end face 228 can be used if desired to insure electrical connectivity to the carbon film 218. Mechanically, the pin 221 is joined to the trigger electrode 206 by braze alloy layer 224a. The carbon coated end face 228 of the trigger probe 214 can be arranged to be substantially even with the top surface of the graphite block 204 and is arranged to face the eventual anode 202. The cathode layer can as well comprise a second metallic layer 222 (e.g. niobium) as described above to allow easy adjustment of the eventual anode-cathode gap 108.

A second ceramic insulator layer 210 (e.g. 94% alumina) is disposed onto braze alloy layer 224d for eventual joining to the cathode layer, comprising support structure 212 gap adjustment layer 222 and graphite block 204. The second ceramic insulator layer 210 comprises a plurality of clearances through which a plurality of anodes 202 are each placed into, substantially in alignment with a trigger probe 214. The anode structure can comprise a niobium member (e.g. disk) 202 formed or stamped (e.g. cup shaped) to comprise a protrusion arranged to extend through the clearance gap in ceramic insulator 210 and a flange for joining the disk to the ceramic insulator 210 by means of braze alloy layer 224e. A second niobium member (e.g. disk) 201 can be joined to the first niobium member 202 by means of braze alloy layer 224f to facilitate making electrical contact to the anode structure, i.e. by providing a flat surface for an electrical contact.

A second support substrate 230b (e.g. alumina plate, alignment layer) having clearances for the anodes and alignment through-holes 240 for insertion of alignment pins (not shown) can be placed on top of the stacked assembly and by means of corresponding through holes in the common layers (e.g. braze alloy layers, ceramic insulator layers, anode and cathode layers) serve to align the layers and components of the eventual switch tube sub-assemblies. Other alignment mechanisms can be employed as well such as aligning the edges of the various layers against mechanical stops, as a particular application may warrant. Parting lines "A", "B", "C" and "D" indicate approximate locations where the eventual joined stack-up can be sawn or cut to singulate individual vacuum switch tubes from the joined (e.g. bonded) assembly of layers.

Figure 3:
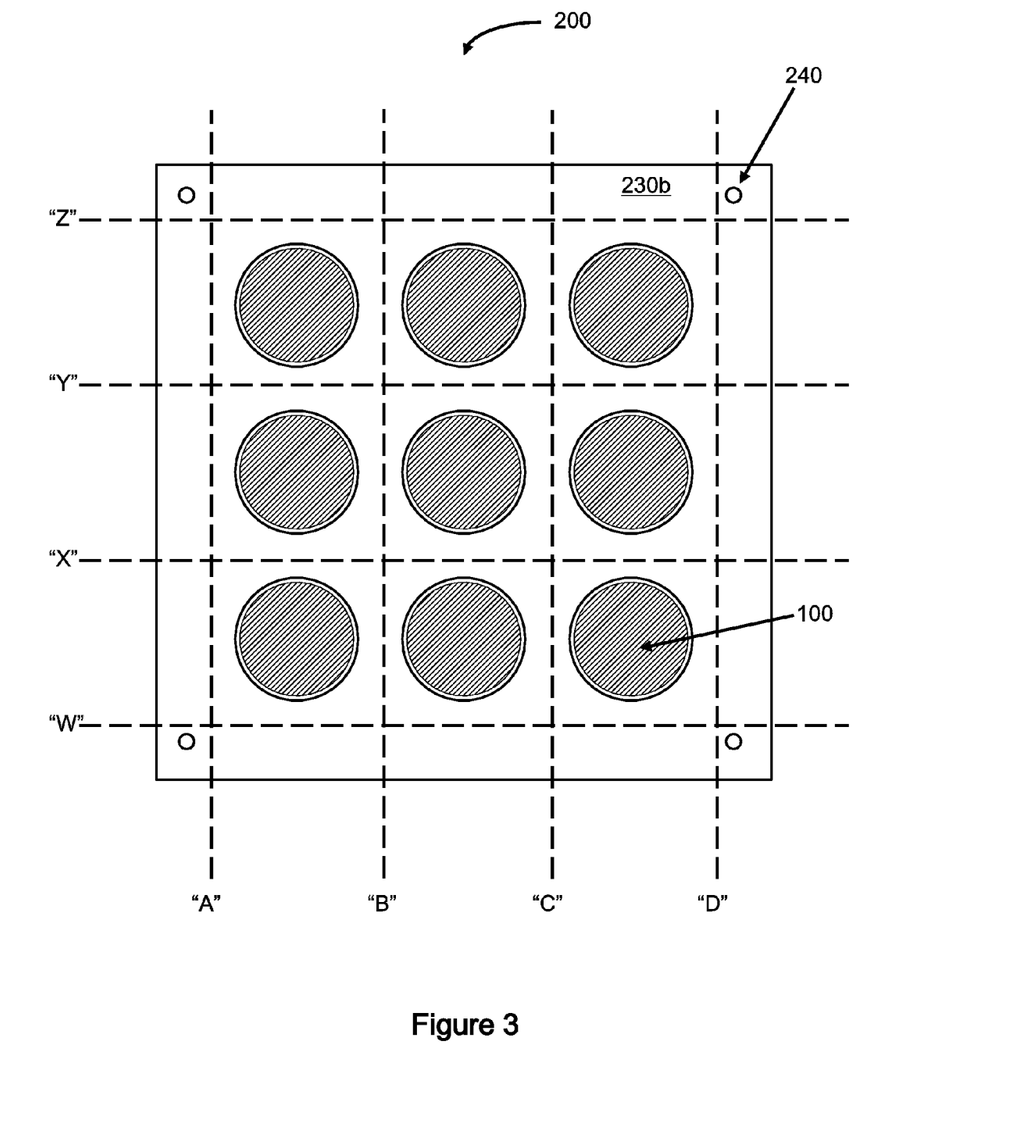
FIG. 3 is a schematic plan view of the stacked assembly of layers comprising a plurality of spacedly adjacent switch tube assemblies from FIG. 2.

FIG. 3 is a schematic plan view of the stacked assembly of layers comprising a plurality of spacedly adjacent switch tube assemblies from FIG. 2. FIG. 3 illustrates a three by three array of nine vacuum switch tubes as can be batch fabricated by embodiments of methods according to the present invention. Parting lines "A", "B", "C" and "X", "Y", "Z" indicate approximate sawing lines for singulating the switch tubes. Batch fabrication of nine switch tubes is indicated, but any number as convenient for an application can be produced by the methods of the invention.

Figure 4:
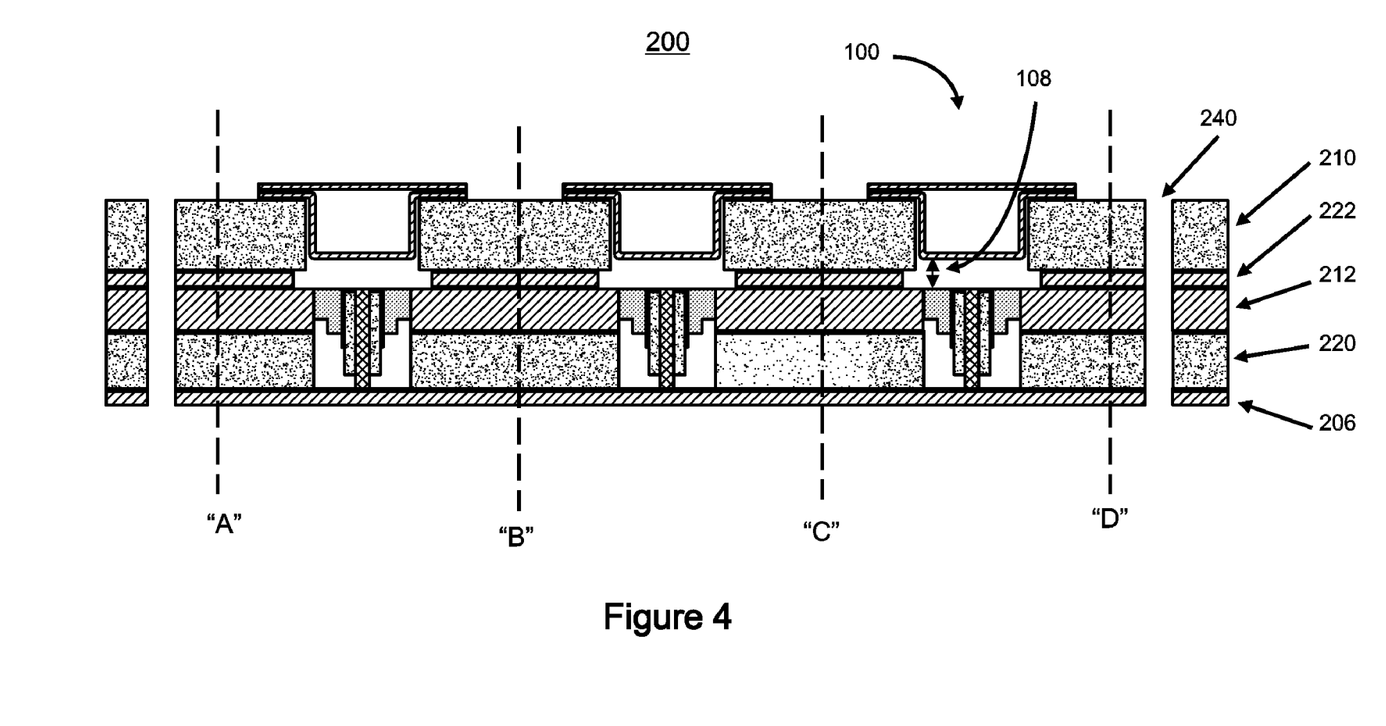
FIG. 4 is a schematic cross-sectional view of an embodiment of a stacked assembly of layers from FIG. 2, after joining and prior to singulation of individual vacuum switch tubes.

FIG. 4 is a schematic cross-sectional view of an embodiment of a stacked assembly of layers from FIG. 2, after joining (e.g. brazing) and prior to singulation of individual vacuum switch tubes 100. After assembling the layers including the common layers, alignment layers and switch tube components as described above, the entire assembly of layers is placed into a vacuum oven, evacuated (e.g. to a pressure on the order of $1\times10^{-7}$ mmHg) and heated to effect reflow of the braze alloy layers 224, thereby sealing a vacuum in the region of the anode-cathode gap 108, and joining the layers into a cohesive structure. Placing weights on the top of the assembly to facilitate good contact between the layers can be employed during the brazing process. For an embodiment wherein the ceramic insulator layers comprise approximately 94% alumina, and are joined to niobium anode, cathode and trigger electrode layers using a commercially available direct braze alloy comprising approximately (62% Cu, 35% Au, 3% Ni) joining can be effected by heating the assembly under vacuum to approximately 1060° C., and allowing the assembly to cool while under vacuum, until the braze alloy solidifies. As described above, active metal braze alloys could be used as well with neither approach requiring the metallization of the ceramic insulator layers. After the joining operating, individual switch tubes 100 can be cut from the stacked assembly 200 by sawing along parting lines, e.g. "A", "B", "C" "D", "W", "X", "Y" and "Z" as illustrated in FIG. 3, to produce switch tubes as exemplified by the embodiment illustrated in FIG. 1.

In a non-limiting exemplary embodiment of the invention, vacuum switch tubes of a configuration as illustrated in FIG. 1 were fabricated having a diameter of approximately 0.225 inches, overall thickness of 0.160 inches, and anode cathode gap of 0.025 to 0.028 inches, for an application requiring the switching of 1500 volts and 5000 amperes (0.2 micro-farads) wherein the individual layer definitions (from FIG. 2A) were as given in Table 1.

TABLE 1

Exemplary layer definitions.

| Layer ID | Material | Layer Thickness (inches) | Description |
| --- | --- | --- | --- |
| 206 | Niobium | 0.010 | Trigger Electrode |
| 224a | 62% Cu, 35% Au, 3% Ni | 0.002 | Braze Alloy |
| 220 | 94% Alumina | 0.040 | Insulator |
| 224b | 62% Cu, 35% Au, 3% Ni | 0.002 | Braze Alloy |
| 214 | Coated Alumina | 0.060 | Trigger Probe |
| 204 | Graphite | 0.020 | Cathode Graphite Block |
| 212 | Niobium | 0.030 | Cathode Support |
| 224c | 62% Cu, 35% Au, 3% Ni | 0.004 | Braze Alloy |
| 222 | Niobium | 0.010 | Cathode Gap Adjustment Layer |
| 224d | 62% Cu, 35% Au, 3% Ni | 0.004 | Braze Alloy |
| 210 | 94% Alumina | 0.050 | Insulator |
| 224e | 62% Cu, 35% Au, 3% Ni | 0.001 | Braze Alloy Washer 0.160" OD |
| 202 | Niobium | — | Anode, 0.160" OD × 0.076" |
| 224f | 62% Cu, 35% Au, 3% Ni | 0.001 | Braze Alloy Disk 0.160" OD |
| 201 | | — | Anode Cap, 0.160" × 0.005" Thick |

While it is not necessary for all braze alloy layers to comprise the same composition, it can be convenient in many applications to do so.

The above described exemplary embodiments present several variants of the invention but do not limit the scope of the invention. Those skilled in the art will appreciate that the present invention can be implemented in other equivalent ways. The actual scope of the invention is intended to be defined in the following claims.

What is claimed is:
1. A method for batch fabrication of cold cathode vacuum switch tubes, the method comprising:
 providing a stacked assembly of layers comprising a plurality of spacedly adjacent vacuum switch tube sub-assemblies arranged in one or more aligned common layers, the stacked assembly of layers comprising,
 a trigger electrode layer, a cathode layer comprising a cathode support having a plurality of spacedly adjacent graphite cathodes disposed there through;
a first electrically insulating layer disposed between the trigger electrode layer and the cathode layer,
a plurality of spacedly adjacent trigger probes, each trigger probe extending through one of the plurality of graphite cathodes, each trigger probe comprising a ceramic insulator having a carbon coating on an end face and at least a portion of the sidewall of the ceramic insulator, each trigger probe comprising an electrical conductor extending through the ceramic insulator thereby electrically connecting the carbon coating on the end face of the ceramic insulator to the trigger electrode layer,
a second electrically insulating layer disposed on the cathode layer opposed to the first electrically insulating layer,
a plurality of spacedly adjacent anodes, each anode extending at least partially through a clearance through the second electrically insulating layer and being substantially aligned with a corresponding trigger probe,
one or more braze alloy layers disposed between the one or more common layers,
means for aligning the one or more common layers; and,
heating the stacked assembly of layers in a vacuum oven to cause the one or more braze alloy layers to join the stacked assembly of layers into a cohesive assembly wherein a vacuum environment is created between each anode and each corresponding cathode.

2. The method of claim 1 including the step of singulating one or more of the spacedly adjacent tube sub-assemblies from the cohesive assembly.

3. The method of claim 1 wherein the means for aligning the one or more common layers comprises one or more alignment pins disposed through one or more common layers of the stacked assembly.

4. The method of claim 1 wherein the plurality of spacedly adjacent anodes each comprises a first portion comprising a flange and a protrusion extending from the flange and at least partially through the corresponding clearance through the second electrically insulating layer and, a second portion comprising a cap disposed on the flange.

5. The method of claim 1 wherein the cathode layer comprises a plurality of layers of an electrically conductive material, at least one of the layers of electrically conductive material operatively arranged to establish a desired gap between the anode and the cathode of each switch tube sub-assembly.

6. A method for batch fabrication of cold cathode vacuum switch tubes, the method comprising:
providing a stacked assembly of layers comprising a plurality of spacedly adjacent vacuum switch tube sub-assemblies arranged in one or more aligned common layers, the stacked assembly of layers comprising,
a niobium trigger electrode layer,
a cathode layer comprising a niobium cathode support having a plurality of spacedly adjacent graphite cathodes disposed there through;
a first alumina insulator layer disposed between the trigger electrode layer and the cathode layer,
a plurality of spacedly adjacent trigger probes, each trigger probe extending through one of the plurality of graphite cathodes, each trigger probe comprising a cylindrical ceramic insulator having a carbon coating on an end face and at least a portion of the sidewall of the ceramic insulator, each trigger probe comprising an electrical conductor extending through the ceramic insulator thereby electrically connecting the carbon coating on the end face of the alumina insulator to the trigger electrode layer,
a second alumina insulator layer disposed on the cathode layer opposed to the first alumina insulator layer,
a plurality of spacedly adjacent niobium anodes, each niobium anode extending at least partially through a clearance through the second alumina insulator layer and being substantially aligned with a corresponding trigger probe,
one or more braze alloy layers disposed between the one or more common layers,
one or more alignment pins extending through the one or more common layers; and,
heating the stacked assembly of layers in a vacuum oven to cause the one or more braze alloy layers to join the stacked assembly of layers into a cohesive assembly wherein a vacuum environment is created between each anode and each corresponding cathode.

7. The method of claim 6 including the step of singulating one or more of the spacedly adjacent tube sub-assemblies from the cohesive assembly.

8. The method of claim 6 wherein the plurality of spacedly adjacent niobium anodes each comprises a first portion comprising a flange and a protrusion extending from the flange and at least partially through the corresponding clearance through the second alumina insulator layer and, a second portion comprising a cap disposed on the flange.

9. The method of claim 6 wherein the cathode layer comprises a plurality of niobium layers, at least one of the niobium layers operatively arranged to establish a desired gap between the anode and the cathode of each switch tube sub-assembly.

10. The method of claim 6 wherein the one or more braze alloy layers comprise one or more active metal braze alloys comprising a constituent selected from the group consisting of zirconium and titanium.

11. The method of claim 10 wherein the one or more active metal braze alloys are selected from one or more compositions consisting essentially of {59% Ag, 27.25% Cu, 12.5% In, 1.25% Ti}, {63% Ag, 35.25% Cu, 1.75% Ti}, {62% Cu, 35% Au, 2% Ti, 1% Ni} and {97% Ag, 1% Cu, 2% Zr}.

12. The method of claim 6 wherein the one or more braze alloy layers comprise one or more direct braze alloys selected from one or more compositions consisting essentially of {62% Cu, 35% Au, 3% Ni}, {82% Au, 8% Pd} and {50% Au, 50% Cu}.

13. The method of claim 6 wherein the step of heating comprises heating the stacked assembly of layers in a vacuum oven to a temperature within a range of temperature of from approximately 1000 degrees centigrade (° C.) up to approximately 1270 degrees centigrade (° C.).

14. The method of claim 6 wherein the first and the second alumina insulator layers consist essentially of 94% alumina.

15. The method of claim 6 including the step of depositing the carbon coating on the cylindrical ceramic insulator by the process of chemical vapor deposition (CVD).

16. The method of claim 15 including the step of removing the deposited carbon coating from at least a portion of the cylindrical ceramic insulator by a process selected from the group consisting of mechanically abrading and laser ablating.

* * * * *